(12) United States Patent
Yoda (10) Patent No.: US 8,289,420 B2
(45) Date of Patent: Oct. 16, 2012

(54) IMAGE PROCESSING DEVICE, CAMERA DEVICE, IMAGE PROCESSING METHOD, AND PROGRAM

(75) Inventor: Koji Yoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 12/038,682

(22) Filed: Feb. 27, 2008

(65) Prior Publication Data

US 2008/0218606 A1 Sep. 11, 2008

(30) Foreign Application Priority Data

Mar. 8, 2007 (JP) ................................. 2007-058280

(51) Int. Cl.
*H04N 7/00* (2011.01)
*H04N 5/262* (2006.01)
*H04N 5/217* (2011.01)
*H04N 9/04* (2006.01)
*G06K 9/36* (2006.01)

(52) U.S. Cl. ....... 348/240.2; 348/39; 348/241; 348/369; 382/276

(58) Field of Classification Search .................... 348/39, 348/222.1, 240.99, 240.2, 241, 335, 340, 348/369; 382/276
See application file for complete search history.

(56) References Cited

U.S. PATENT DOCUMENTS

| | | | | |
|---|---|---|---|---|
| 5,185,667 | A * | 2/1993 | Zimmermann | 348/207.99 |
| 6,005,611 | A * | 12/1999 | Gullichsen et al. | 348/211.6 |
| 7,593,041 | B2 * | 9/2009 | Novak | 348/211.9 |
| 2006/0110050 | A1 * | 5/2006 | Aoyama et al. | 382/232 |
| 2009/0160996 | A1 * | 6/2009 | Yamaoka et al. | 348/333.11 |

FOREIGN PATENT DOCUMENTS

| | | |
|---|---|---|
| JP | 06-036020 | 2/1994 |
| JP | 2001-145012 | 5/2001 |
| JP | 2004-080545 | 3/2004 |

* cited by examiner

*Primary Examiner* — Daniel M Pasiewicz
(74) *Attorney, Agent, or Firm* — K&L Gates LLP

(57) ABSTRACT

Disclosed herein is an image processing device capable of correcting distortion of au original image picked up bad a wide-angle lens using distortion correcting parameters formed in a form of a lattice. The image processing device includes a processing unit configured to sharably process distortion correcting parameters for at least one of an arbitrary pan angle and an arbitrary tilt angle on a basis of a fact that distortion of the wide-angle lens has symmetry from a central point of an optical axis.

12 Claims, 9 Drawing Sheets

EXAMPLE OF PAN/TILT IN NINE REGIONS

EXAMPLE OF PAN/TILT IN NINE REGIONS

IMAGE PROCESSING DEVICE, CAMERA DEVICE, IMAGE PROCESSING METHOD, AND PROGRAM

CROSS REFERENCES TO RELATED APPLICATIONS

The present application claims priority to Japanese Patent Application JP 2007-058280 filed with the Japan Patent Office on Mar. 8, 2007, the entire contents of which being incorporated herein by reference.

BACKGROUND

The present invention relates to an image processing device, a camera device, an image processing method, and a program that have a function of correcting the distortion of an image picked up by a wide-angle lens, for example.

A technique is known which performs distortion correction using distortion correcting parameters (vectors) arranged in the form of a lattice on the basis of an image picked up by a wide-angle lens.

When electronic panning/tilting is to be performed using this technique, a plurality of kinds of distortion correcting parameters at arbitrary pan/tilt angles and angles of view have to be prepared in advance and stored in a storage device.

However, because a plurality of kinds of distortion correcting parameters at arbitrary pan/tilt angles and angles of view have to be prepared in advance for an electronic pan/tilt, the above-described technique has a disadvantage in that the capacity of a storage device for the distortion correcting parameters is increased and thus cost in terms of a system is increased.

In addition, when distortion correcting parameters for an electronic pan/tilt are downloaded from a host computer to a camera system for performing distortion correction and the electronic pan/tilt by a communication, there is a disadvantage in that an amount of communication is increased and a load in the process of each system is increased because distortion correcting parameters have to be communicated each time a pan/tilt angle is changed.

SUMMARY

It is desirable to provide an image processing device, a camera device, an image processing method, and a program that can reduce the capacity of a storage device for storing distortion correcting parameters and in turn reduce cost in terms of a system, and reduce an amount of communication of distortion correcting parameters.

According to a first embodiment, there is provided an image processing device capable of correcting distortion of an original image picked up by a wide-angle lens using distortion correcting parameters formed in a form of a lattice. The image processing device includes a processing unit configured to sharably process distortion correcting parameters for at least one of an arbitrary pan angle and an arbitrary tilt angle on a basis of a fact that distortion of the vide-angle lens has symmetry from a central point of an optical axis.

According to a second embodiment, there is provided a camera device having an electronic pan and tilt function. The camera device includes: an image pickup element; an optical system configured to form an image of a subject on the image pickup element, the optical system including a wide-angle lens having point-symmetric distortion with an optical axis as a center; and an image processing device capable of correcting distortion of an original image picked up by the wide-angle lens and the image pickup element using distortion correcting parameters formed in a form of a lattice. The image processing device includes a processing unit configured to sharably process distortion correcting parameters for at least one of an arbitrary pan angle and an arbitrary tilt angle on a basis of a fact that distortion of the wide-angle lens has symmetry, from a central point of the optical axis.

According to a third embodiment, there is provided an image processing method capable of correcting distortion of an original image picked up by a wide-angle lens using distortion correcting parameters formed in a form of a lattice, the image processing method including the step of generating new distortion correcting parameters symmetrically with respect to an optical axis center line touching a central point of an optical axis by subjecting distortion correcting parameters for at least one of an arbitrary pan angle and an arbitrary tilt angle to mirror image processing with the optical axis center line as an axis on a basis of a fact that distortion of the wide-angle lens has symmetry from the central point of the optical axis, and sharably processing the new distortion correcting parameters.

According to a fourth embodiment, there is provided a program for making a computer perform image processing for correcting distortion of an original image picked up by a wide-angle lens using distortion correcting parameters formed in a form of a lattice, the program including the step of generating new distortion correcting parameters symmetrically with respect to an optical axis center line touching a central point of in optical axis by subjecting distortion correcting parameters for at least one of an arbitrary pan angle and an arbitrary tilt angle to mirror image processing with the optical axis center line as an axis on a basis of a fact that distortion of the wide-angle lens has symmetry from the central point of the optical axis, and sharably processing the new distortion correcting parameters.

According to the present embodiment, in a processing unit, new distortion correcting parameters are generated symmetrically with respect to an optical axis center line touching a central point of an optical axis by subjecting distortion correcting parameters for an arbitrary pan angle and/or an arbitrary tilt angle, for example, to mirror image processing with the optical axis center line as an axis on a basis of a fact that distortion of the wide-angle lens has symmetry from the central point of the optical axis, and the new distortion correcting parameters are sharably processed.

According to the present embodiment, it is possible to reduce the capacity of a storage device for storing distortion correcting parameters and in turn reduce cost in terms of a system, and reduce an amount of communication of distortion correcting parameters.

Additional features and advantages are described herein, and will be apparent from the following Detailed Description and the figures.

DETAILED DESCRIPTION

Embodiments of the application invention will be described below in greater detail with reference to the drawings.

Figure 1:
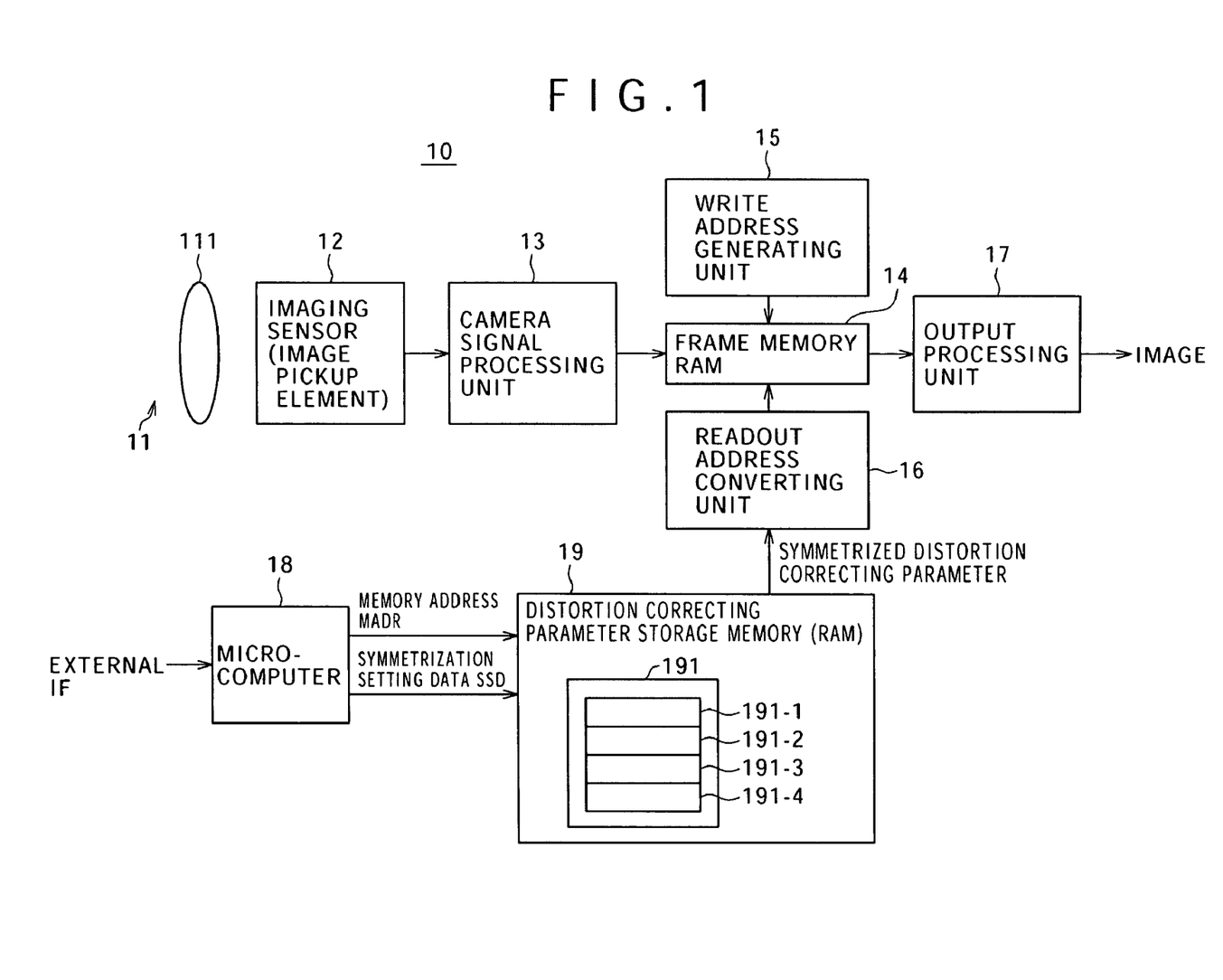
FIG. 1 is a block diagram showing an example of configuration of a camera device using an image processing device according to an embodiment.

FIG. 1 is a block diagram showing an example of configuration of a camera device using an image processing device according to an embodiment.

As shown in FIG. 1, the camera device 10 according to the present embodiment includes an optical system 11, an image pickup element (imaging sensor) 12, a camera signal processing unit 13, a frame memory 14, a write address generating unit 15, a readout address converting unit 16, an output processing unit 17, a microcomputer (micon) 18, and a distortion correcting parameter symmetrizing unit 19.

The frame memory 14, the write address generating unit 15, the readout address converting unit 16, the output processing unit 17, the microcomputer (micon) 18, and the distortion correcting parameter symmetrizing unit 19 form a processing unit of the image processing device.

Incidentally in the present embodiment, distortion correcting parameters for lens distortion aberration will be referred to simply as distortion correcting parameters.

The camera device 10 according to the present embodiment can perform distortion correction and electronic panning and tilting using distortion correcting parameters (vectors) spread in the form of a lattice on the basis of an image picked up by a wide-angle lens having a point-symmetric distortion with an optical axis as a center. The camera device 10 can share distortion correcting parameters for arbitrary pan and/or tilt angles utilizing the symmetry of the distortion of the wide-angle lens from the central point of the optical axis.

The camera device 10 basically subjects distortion correcting parameters (vectors) for an arbitrary pan/tilt angle to a process of mirror image conversion in a pan direction (horizontal direction) or a tilt direction (vertical direction) using, as an axis, a first optical axis center line (vertical line) or a second optical axis center line (horizontal line) that touches the central point of the optical axis, thereby generating newts distortion correcting parameters horizontally or vertically symmetrically from the vertical line or the horizontal line.

Description in the following will be made supposing that the pan direction is the horizontal direction and that the tilt direction is the vertical direction.

The camera device 10 according to the present embodiment performs cutout (a pan, a tilt, and a zoom), rotation, a mirror image process, synthesis, and the like while correcting the distortion of an image obtained by super-wide-angle image pickup by using symmetrized new distortion correcting parameters.

At this time, the microcomputer 18 may store the distortion correcting parameters in a memory such as a built-in ROM/RAM or the like, may obtain the distortion correcting parameters by calculation of the microcomputer 18, or can be configured to receive the distortion correcting parameters through an external communication from a host computer (not shown) to which the camera device 10 is connected via a transmission line.

The optical system 11 includes a wide-angle lens 111 formed by a super-wide-angle lens, for example. The optical system 11 forms an image of a subject on an image pickup surface of the image pickup element 12 through the wide-angle lens 111.

The image pickup element 12 is formed by an imaging sensor, which is a CCD (Charge Coupled Device) or CMOS (Complementary Metal Oxide Semiconductor) device, for example.

The image pickup element 12 detects the image of the subject, which image is formed by the optical system 11, by optical sensors arranged in the form of a matrix on a semiconductor substrate, generates a signal charge, reads the signal charge via a vertical signal line and a horizontal signal line, and outputs a digital image signal of the subject to the camera signal processing unit 13.

The camera signal processing unit 13 performs processes such as a color interpolation, a white balance, a YCbCr conversion process, compression, filing and the like, and then outputs the result to the frame memory 14.

The frame memory 14 is formed by a RAM. The frame memory 14 sequentially stores image data output by the camera signal processing unit 13 at an address generated by the write address generating unit 15.

The frame memory 14 is supplied with a real address obtained by converting a symmetrized distortion correcting parameter (vector) in the readout address converting unit 16. The distortion of a part to be corrected in a stored original image is corrected by the continuously changing distortion correcting parameter.

The image data read from the frame memory 14 is an image resulting from distortion correction, cutout synthesis and the like. The image data is output to the output processing unit 17.

The readout address converting unit 16 converts the vectors of distortion correcting parameters sequentially generated by the distortion correcting parameter symmetrizing unit 19 into a real address, and then supplies the real address to the frame memory 14.

In the frame memory 14, the distortion of the part to be corrected in the original image is corrected smoothly by the substantially continuously changing distortion correcting parameters.

The output processing unit 17 subjects the image data obtained by subjecting the original image to distortion correction, cutout, synthesis and the like, the image data being output from the frame memory, 14, to a gamma process, a mask process, format conversion and the like, and then outputs the result to the outside.

The microcomputer 18 supplies the distortion correcting parameter symmetrizing unit 19 with a memory address MADR for accessing a distortion correcting parameter storage memory (RAM) 191 storing a distortion correcting parameter indicating an original image part to be hereafter corrected for distortion, the distortion correcting parameter storage memory (RAM) 191 being disposed in the distortion correcting parameter symmetrizing unit 19, and symmetrization setting data SSD for symmetrizing the distortion correcting parameter.

The symmetrization setting data SSD includes data indicating "symmetrizing, horizontally (in the pan direction)", "symmetrizing vertically (in the tilt direction)", "symmetrizing horizontally and vertically (vertically and horizontally)", and "not symmetrizing" the distortion correcting parameter.

Incidentally, as described above, the microcomputer 18 may store the distortion correcting parameter in a memory such as a built-in ROM/RAM or the like, may obtain the distortion correcting parameter by calculation of the microcomputer 18, or can be configured to receive the distortion correcting parameter through an external communication from a host computer (not shown) to which the camera device 10 is connected via a transmission line.

The distortion correcting parameter symmetrizing unit 19 supplies the distortion correcting parameter (vector) storage memory (RAM) 191 with a converted address obtained by converting the memory address MADR supplied from the microcomputer 18 according to a symmetrization form (horizontal symmetrization, vertical symmetrization, horizontal and vertical symmetrization, or no symmetrization) specified by the symmetrization setting data SSD supplied from the same microcomputer 18 or a non-converted address. The distortion correcting parameter symmetrizing unit 19 generates a symmetrized distortion correcting parameter by giving a predetermined coefficient or sign to the distortion correcting parameter read from the distortion correcting parameter (vector) storage memory (RAM) 191. The distortion correcting parameter symmetrizing unit 19 then outputs the symmetrized distortion correcting parameter to the readout address converting unit 16.

The distortion correcting parameter (vector) storage memory (RAM) 191 has for example a plurality of RAMs 191-1 to 191-4 (four RAMs in the example of FIG. 1). Incidentally, the number of RAMs corresponds to kinds (the number) of distortion correcting parameters to be interpolated and a system and is arbitrary.

A more concrete description will be made in the following of the distortion correcting parameter for an image obtained by wide-angle image pickup, a distortion correcting technique, a symmetrization concept and the like according to the present embodiment.

<Summary of Distortion Correcting Technique and Distortion Correcting Parameter>

The correcting technique will first be described briefly.

Figure 2:
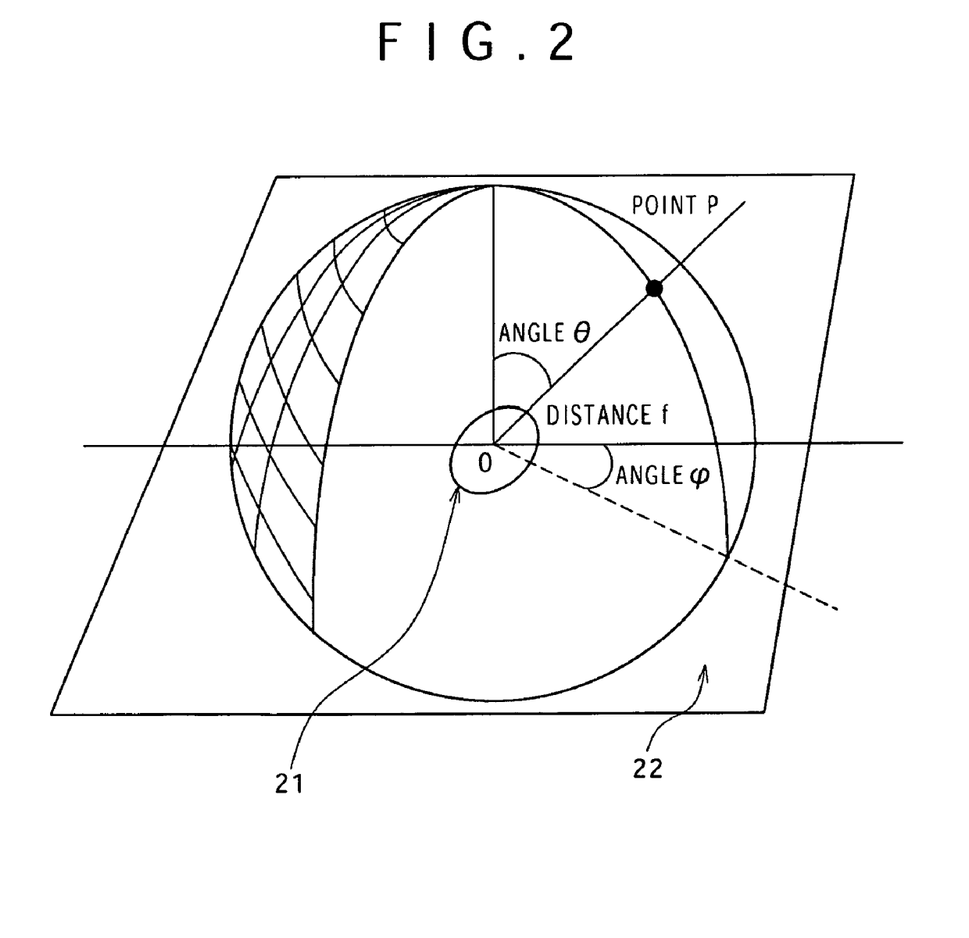
FIG. 2 is a diagram showing a concept of image pickup using a wide-angle lens.

FIG. 2 is a diagram showing a concept of image pickup using a wide-angle lens.

In FIG. 2, a circle indicated by reference numeral 21 is an image projected by the super-wide-angle lens 111, and reference numeral 22 denotes the image pickup surface of the image pickup element 12.

Figure 3:
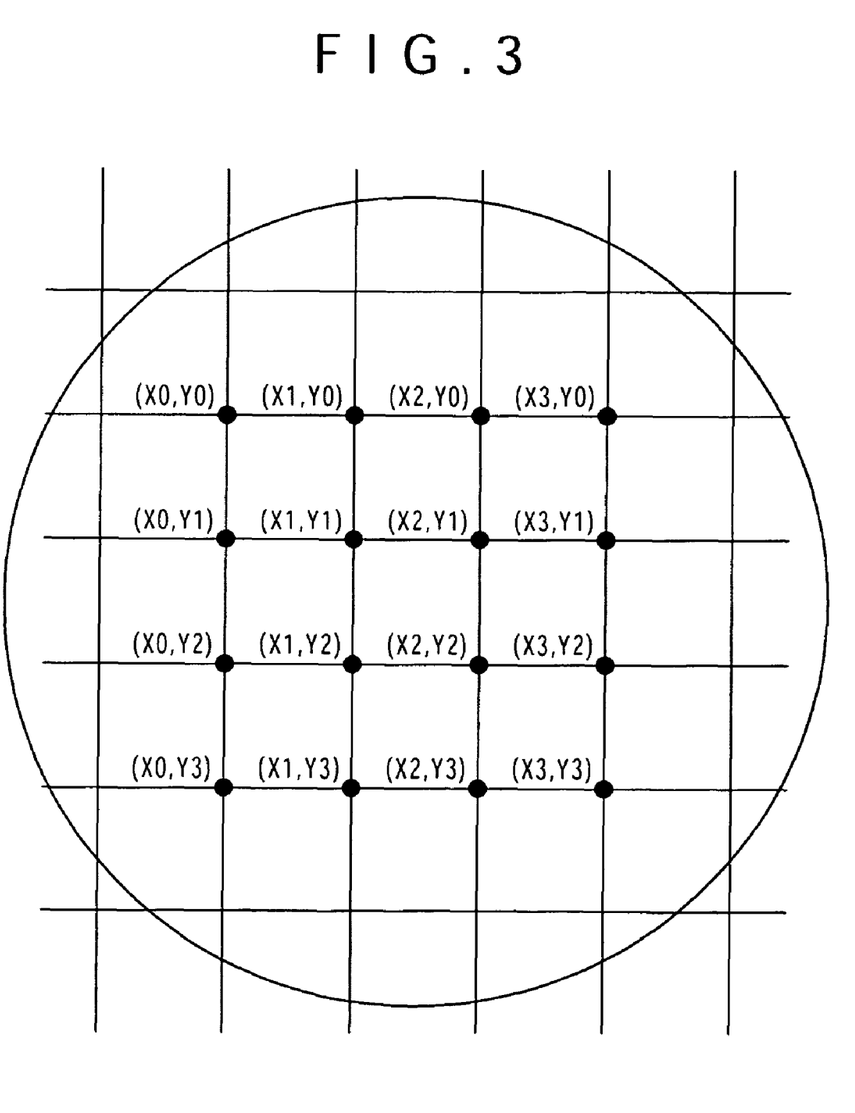
FIG. 3 is a diagram showing an example of lattice arrangement of distortion correcting vectors.

In the calculation of the distortion correcting parameter, as shown in FIG. 2, a lattice showing the distortion aberration of a wide-angle lens is obtained by projecting an image of a lattice showing the distortion aberration of the wide-angle lens 111 onto the image pickup surface (plane) 22. Then, as shown in FIG. 3, each lattice vector (X, Y) is obtained such that the lattice showing the distortion aberration of the videangle lens 111 coincides with the tetragonal lattice of the image pickup surface 22.

Figure 4:
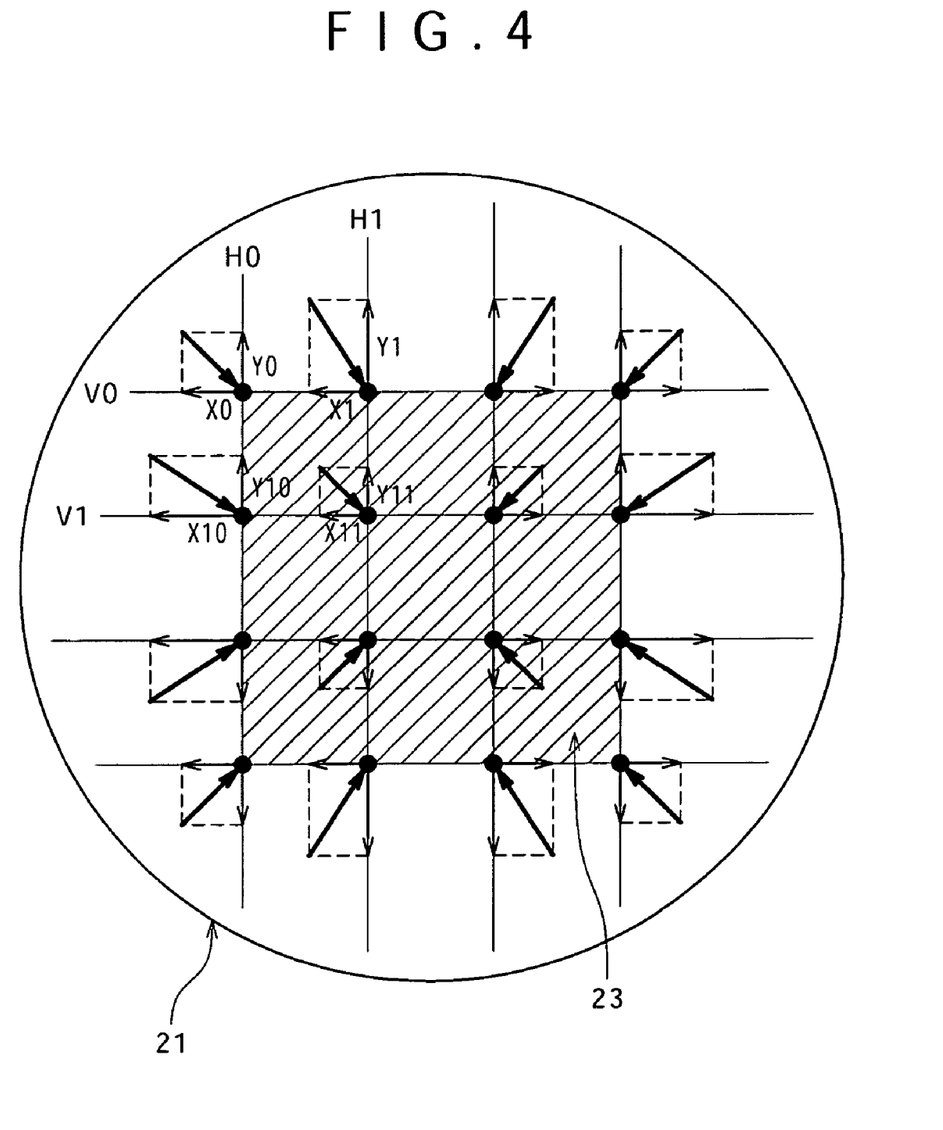
FIG. 4 is a diagram of assistance in explaining an example of distortion correction.

Thus, as shown in FIG. 4, a distortion correcting parameter is indicated by a vector (X, Y) indicating each lattice point in the original image before distortion correction for each lattice point in an output image.

At this time, an angle of view (zoom magnification) can be changed by a distance f of a normal OP in FIG. 2, and a cutout region can be changed (a pan and a tilt) by a zenith angle θ and an azimuth φ.

An interpolation between lattice points is performed using the vectors of lattice points around a lattice point of interest.

An interpolation algorithm at this time may be a nearest neighbor method (Nearest Neighbor), a linear interpolation method (Bilinear), or a cubic interpolation method (Bicubic).

<Example of Symmetrization of Distortion Correcting Parameter>

Figure 5:
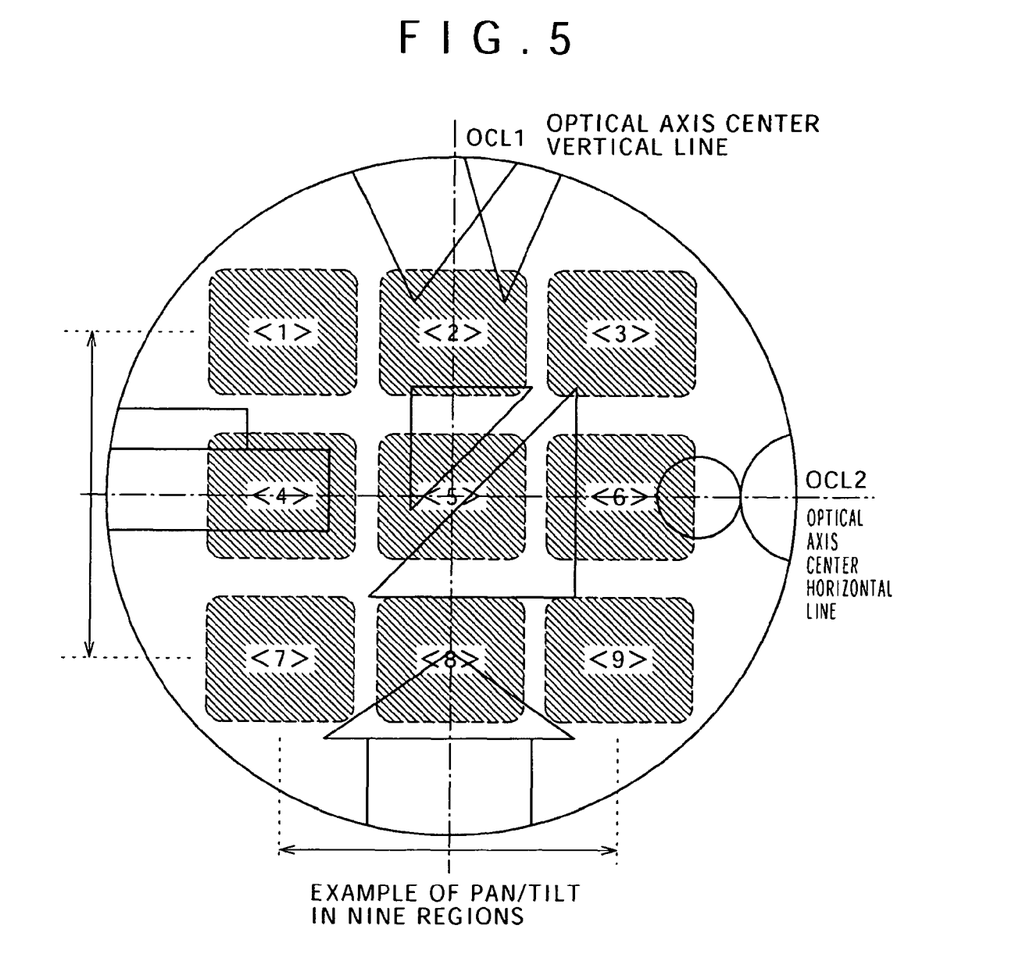
FIG. 5 is a conceptual diagram of a pan/tilt in nine regions.

FIG. 5 is a diagram showing an example in which the distortion of an image picked up by a wide-angle lens is corrected in nine regions <1> to <9>, and a pan and a tilt are realized by selecting these regions.

In the example of FIG. 5, the nine regions <1> to <9> are divided in the form of a lattice (the form of a matrix) having three rows and three columns. The regions <1>, <2>, and <3> are arranged in the first row. The regions <4>, <5> and <6> are arranged in the second row. The regions <7>, <8>, and <9> are arranged in the third row.

The regions <1>, <4>, and <7> are arranged in the first column. The regions <2>, <5>, and <8> are arranged in the second column. The regions <3>, <6>, and <9> are arranged in the third column.

The pan angles of the region <1>, the region <4>, and the region <7> in the first column are a same arbitrary angle from an optical axis center vertical line OCL1 as first optical axis center line. The pan angles of the region <3>, the region <6>, and the region <9> in the third column are the same as the minus angle of the pan angle of the region <1> from the optical axis center vertical line OCL1.

Similarly, the tilt angles of the region <1>, the region <2>, and the region <3> in the first row are a same arbitrary, angle from an optical axis center horizontal line OCL2. The tilt angles of the region <7>, the region <8>, and the region <9> in the third row are the same as the minus angle of the tilt angle of the region <1> from the optical axis center horizontal line OCL2 as second optical axis center line.

Incidentally, the region <5> is an optical axis center, and the pan angle and the tilt angle of the region <5> are both zero degrees. This region <5> is excluded from objects for symmetrization.

A symmetrizing method will be shown below on the basis of the above.

<Distortion Correcting Parameter Horizontal (Pan Direction) Symmetrizing Method (First Symmetrizing Method)>

Figure 6A:
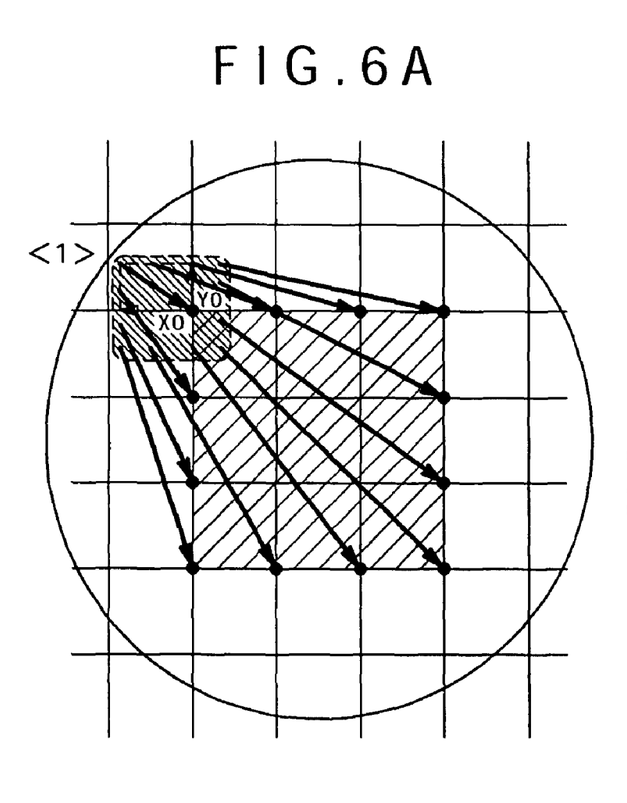
FIGS. 6A and 6B are conceptual diagrams of horizontal symmetrization.
Figure 6B:
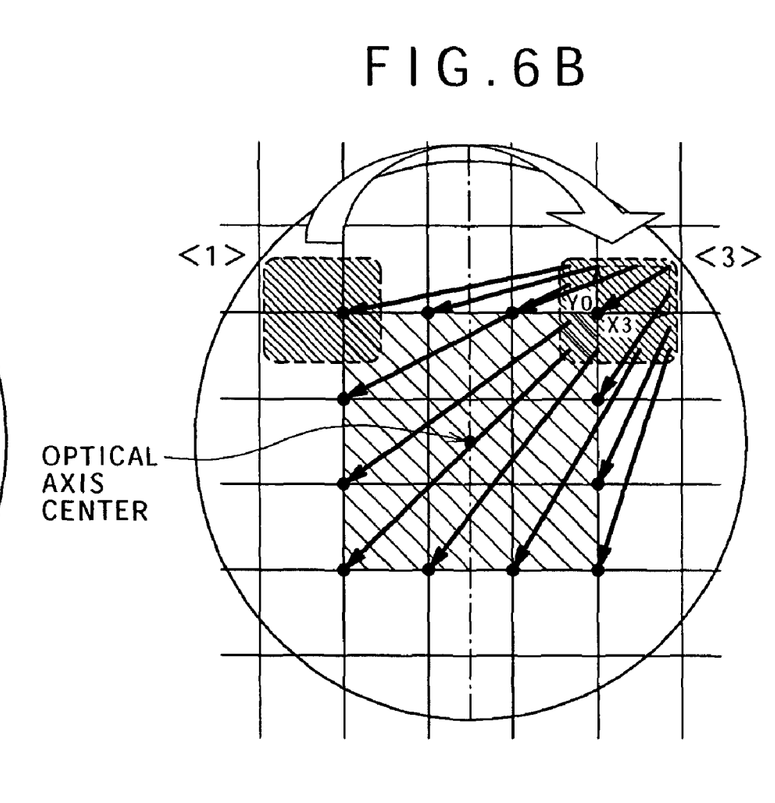

FIGS. 6A and 6B are conceptual diagrams of horizontal symmetrization.

For example, in order to generate a distortion correcting parameter in the region <3> from a distortion correcting parameter in the region <1>, it suffices to turn over a vector (X, Y) at each lattice point horizontally symmetrically with the optical axis center vertical line OCL1 as first optical axis center line touching the optical axis center as an axis, and multiply a vector (X) by a minus at this time.

Describing this with reference to FIG. 3, a vector (X0, Y0) in the region <1> is replaced with the lattice point of a vector (X3, Y0) in the region <3> to be newly generated, and at this time, a vector (X0) is multiplied by a minus.

That is, a conversion is made such that a new vector (Xn, Ym) in the region <3>=a vector (−1·X(3−n),Ym) in the region <1>.

In this example, n and m indicate the arrangement number of each lattice point mad assume a value of 0 to 3.

Incidentally, it is needless to say that this method can generate a distortion correcting parameter in the region <6> from the region <4> and a distortion correcting parameter in the region <9> from the region <7>.

<Distortion Correcting Parameter Vertical (Tilt Direction) Symmetrizing Method (Second Symmetrizing Method)>

Figure 7A:
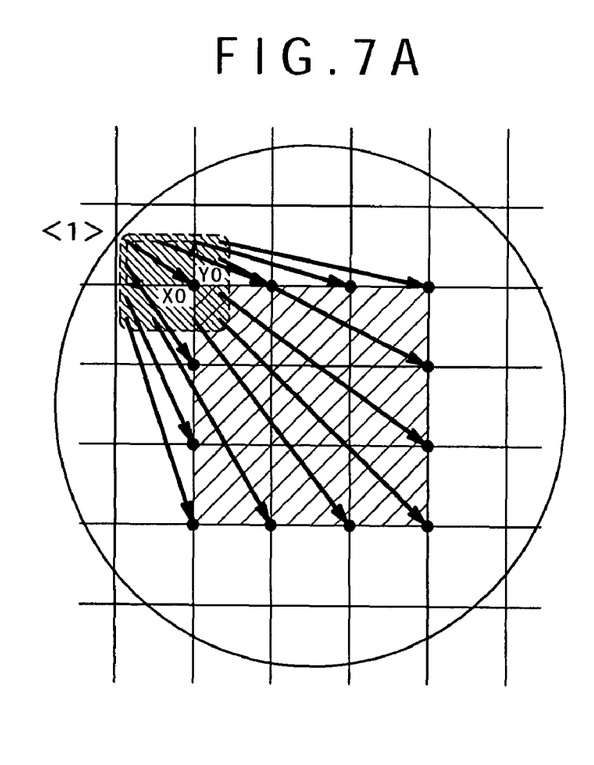
FIGS. 7A and 7B are conceptual diagrams of vertical symmetrization.
Figure 7B:
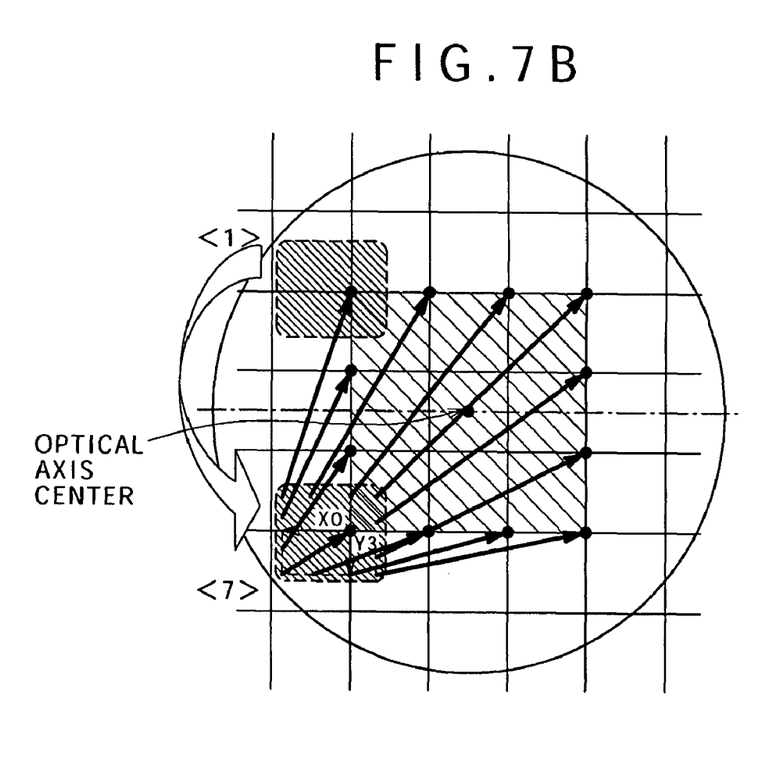

FIGS. 7A and 7B are conceptual diagrams of vertical symmetrization.

For example, in order to generate a distortion correcting parameter in the region <7> from a distortion correcting parameter in the region <1>, it suffices to turn over a vector (X, Y) at each lattice point vertically symmetrically with the optical axis central horizontal line OCL2 as second optical axis center line orthogonal to the first optical axis center line touching the optical axis center as an axis, and multiply a vector (Y) by a minus (−1) at this time.

Describing this with reference to FIG. 3, a vector (X0, Y0) in the region <1> is replaced with the lattice point of a vector (X0, Y3) in the region <7> to be newly generated, and at this time, a vector (Y0) is multiplied by a minus.

That is, a conversion is made such that a new vector (Xn, Ym) in the region <7>=a vector (Xn, −1·Y(3−m)) in the region <1>.

In this example, n and m indicate the arrangement number of each lattice point and assume a value of 0 to 3.

Incidentally, it is needless to say that this method can generate a distortion correcting parameter in the region <8> from the region <2> and a distortion correcting parameter in the region <9> from the region <3>.

<Distortion Correcting Parameter Vertical and Horizontal Symmetrizing Method (Third Symmetrizing Method)>

For example, in order to generate a distortion correcting parameter in the region <9> from a distortion correcting parameter in the region <1>, it suffices to combine the distortion correcting parameter horizontal symmetrizing method and the distortion correcting parameter vertical symmetrizing method shown above with each other.

Describing this with reference to FIG. 3, a conversion is made such that a new vector (Xn, Ym) in the region <9>=a vector (−1·X(3−n), −1·Y(3−m)) in the region <1>.

In this example, n and m indicate the arrangement number of each lattice point and assume a value of 0 to 3.

As described above with reference to FIG. 5, it is shown that when a pan/tilt is realized by correcting the distortion of an image picked up by a wide-angle lens in the nine regions <1> to <9> and selecting the regions, as a result of using <Distortion Correcting Parameter Horizontal Symmetrizing Method>, <Distortion Correcting Parameter Vertical Symmetrizing Method>, and <Distortion Correcting Parameter Vertical and Horizontal Symmetrizing Method> described above, with distortion correcting parameters in the region <1>, the region <2>, the region <4>, and the region <5>, distortion correcting parameters in the other regions, that is, the region <3>, the region <6>, the region <7>, and the region <8> are newly generated.

When the first to third symmetrizing methods described above are used, the region of the optical axis center which region includes an image of great importance, that is, the region <5> in the above-described example is not an object for symmetrization. Thus it is also possible to prevent a degradation in picture quality and the like.

The distortion correcting parameter symmetrizing methods described above are used by the distortion correcting parameter symmetrizing unit 19 in the camera device 10. However, the configuration of the distortion correcting parameter symmetrizing unit 19 may be implemented by hardware or may be implemented by software.

It is needless to say that because distortion correcting parameters are generally stored in a memory such as a RAM a ROM or the like in many cases, as described above, it suffices for the distortion correcting parameter symmetrizing unit 19 to convert a memory address by a similar method at that time and multiply a distortion correcting vector (X) output from the memory by a minus.

Figure 8:
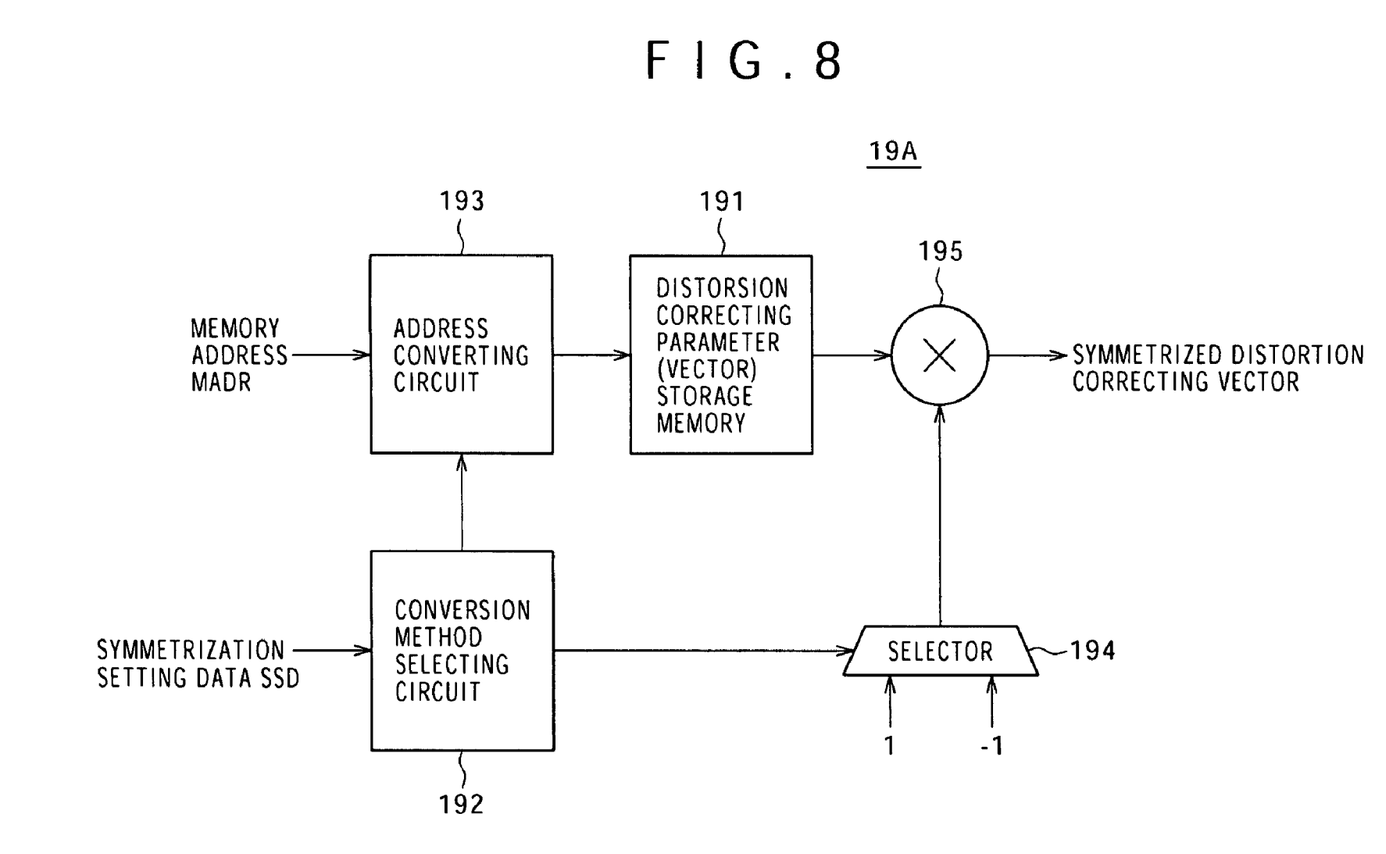
FIG. 8 is a diagram showing an example of hardware configuration of a distortion correcting parameter symmetrizing unit according to the present embodiment.

FIG. 8 is a diagram showing an example of hardware configuration of the distortion correcting parameter symmetrizing unit according to the present embodiment.

Figure 9:
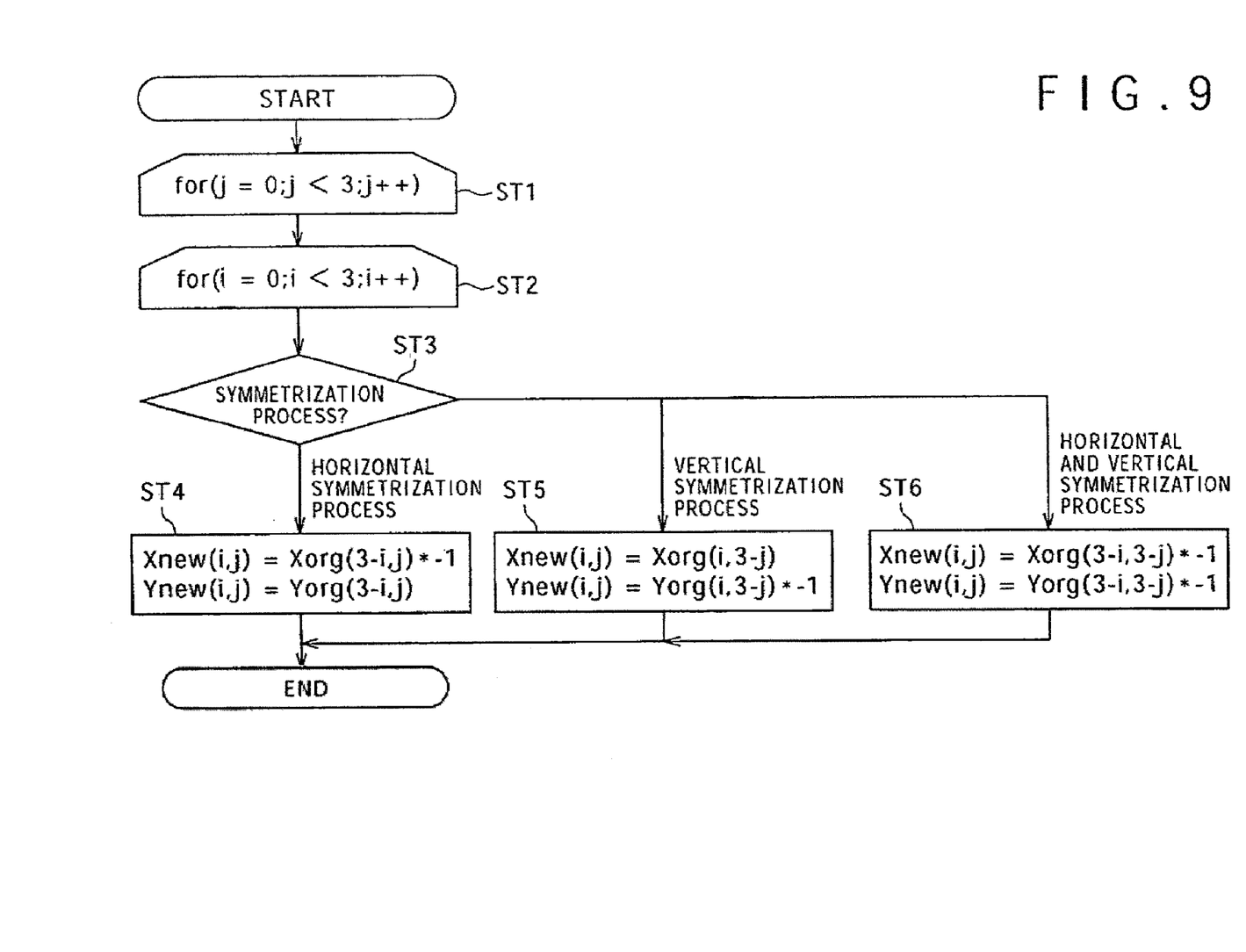
FIG. 9 is a flowchart of software that can be used in the distortion correcting parameter symmetrizing unit according to the present embodiment.

FIG. 9 is a flowchart of software that can be used in the distortion correcting parameter symmetrizing unit according to the present embodiment.

The distortion correcting parameter symmetrizing unit 19A in FIG. 8 includes a distortion correcting parameter (vector) storage memory (RAM) 191, a conversion method selecting circuit 192, an address converting circuit 193, a selector 194, and a multiplier 195.

The conversion method selecting circuit 192 gives an instruction to select an address converting method to the address converting circuit 193 and gives an instruction to select 1 or −1 to the selector 194 according to a symmetrization form (horizontal symmetrization, vertical symmetrization, horizontal and vertical symmetrization, or no symmetrization) specified by the symmetrization setting data SSD supplied from the microcomputer 18.

The address converting circuit 193 supplies the distortion correcting parameter (vector) storage memory (RAM) 191 with a converted address or a non-converted address obtained by converting a memory address MADR supplied from the microcomputer 18 according to the symmetrization form (horizontal symmetrization, vertical symmetrization, horizontal and vertical symmetrization, or no symmetrization) specified by the conversion method selecting circuit 192 or obtained without the address being converted.

The multiplier 195 generates a symmetrized distortion correcting parameter by multiplying, a distortion correcting parameter read from the distortion correcting parameter (vector) storage memory (RAM) 191 by 1 or −1 selected by the selector 194. The multiplier 195 then outputs the symmetrized distortion correcting parameter to the readout address converting unit 16.

In a software process represented in FIG. 9, a distortion correcting vector (Xi, Yj) to be symmetrized is denoted by Xorg(i, j) and Yorg(i, j), and a newly generated distortion correcting vector (Xi, Yj) is denoted by Xnew(i, j) and Ynew (i, j).

Incidentally, variables i and j in FIG. 9 indicate a lattice arrangement number.

In the software process represented in FIG. 9, a process from step ST1 to step ST6 is repeated until the variables (arrangement number) i and j become three (ST1 and ST2).

In step ST3, a type of symmetrization process is determined. When it is determined in step ST3 that the symmetrization process is a horizontal symmetrization process, a transition is made to step ST4, where the horizontal symmetrization process is performed.

In this case, as described in the above <Distortion Correcting Parameter Horizontal Symmetrizing Method>, a distortion correcting vector Xorg(3−i, j) to be symmetrized is multiplied by a minus (−1). A distortion correcting vector Yorg (3−i, j) is not multiplied by a minus (−1) (is multiplied by 1 when associated with the configuration of FIG. 8).

When it is determined in step ST3 that the symmetrization process is a vertical symmetrization process, a transition is made to step ST5, where the vertical symmetrization process is performed.

In this case, as described in the above <Distortion Correcting Parameter Vertical Symmetrizing Method>, a distortion correcting vector Yorg(3−i, j) to be symmetrized is multiplied by a minus (−1). A distortion correcting vector Xorg(3−i, j) is not multiplied by a minus (−1) (is multiplied by 1 when associated with the configuration of FIG. 8).

When it is determined in step ST3 that the symmetrization process is a horizontal and vertical symmetrization process, a transition is made to step ST6, where the horizontal and vertical symmetrization process is performed.

In this case, as described in the above <Distortion Correcting Parameter Horizontal and Vertical Symmetrizing Method>, distortion correcting vectors Xorg(3−i, j) and Yorg (3−i, j) to be symmetrized are multiplied by a minus (−1).

As described above, the present embodiment has the distortion correcting parameter symmetrizing unit 19 that supplies the distortion correcting parameter (vector) storage memory (RAM) 191 with a converted address obtained by converting a memory address MADR supplied from the microcomputer 18 according to a symmetrization form (horizontal symmetrization, vertical symmetrization, horizontal and vertical symmetrization or no symmetrization) specified by symmetrization setting data SSD supplied from the same microcomputer 18 or a non-converted address, generates a symmetrized distortion correcting parameter by giving a predetermined coefficient or sign to a distortion correcting parameter read from the distortion correcting parameter (vector) storage memory (RAM) 191, and then outputs the symmetrized distortion correcting parameter to the readout address converting unit 16. The following effects can therefore be obtained.

It is possible to reduce the capacity of a storage device for storing distortion correcting parameters and reduce cost in terms of a system.

For example, the number of distortion correcting parameters for performing panning/tilting in nine regions of an image obtained by wide-angle image pickup as shown above can be reduced from 9 to 4. For example, the number of distortion correcting parameters for performing panning/tilting in 25 regions of an image obtained by wide-angle image pickup can be reduced from 25 to 5.

2) When distortion correcting parameters are downloaded from a host system by a communication, and sharing is possible, the communication does not need to be performed.

3) Because the sharing of distortion correcting parameters can be realized by a simple software or hardware process, a load in the process of each system can be reduced, and real-time performance is improved (it is easy to achieve a higher frame rate) in some cases, so that viewability is improved.

4) A wide range of applications are possible, including not only distortion correcting parameters in an arbitrary pan/tilt but also distortion correcting parameters obtained by rotation, distortion correcting parameters obtained by a mirror image process, distortion correcting parameters obtained by a synthesizing process and the like, and the effects of 1), 2), and 3) shown above can be further expected.

It is to be noted that the symmetrizing methods shown in the present embodiment are of course applicable not only to distortion correcting parameters in an arbitrary pan/tilt but also to distortion correcting parameters obtained by rotation, distortion correcting parameters obtained by a mirror image process, distortion correcting parameters obtained by a synthesizing process and the like as long as the system performs distortion correction using distortion correcting parameters (vectors) formed (spread) in the form of a lattice on the basis of an image picked up by a wide-angle lens having a point-symmetric distortion with an optical axis as a center.

In addition, while the above description has been made of an example in which nine regions <1> to <9> are divided in the form of a lattice (the form of a matrix) having three rows and three columns and are subjected to symmetrization, the present invention can deal with more regions or fewer regions.

Incidentally, the methods described above in detail can be formed as a program according to the above-described procedure, and carried out by a computer such as a CPU or the like.

In addition, a computer in which a recording medium such as a semiconductor memory, a magnetic disk, an optical disk, a floppy, (registered trademark) disk or the like is set can access such a program and execute the program.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing device configured to correct distortion of an original image picked up by a wide-angle lens having a symmetrical distortion from a central point of an optical axis, the image processing device storing a first distortion correcting vector, a second distortion correcting vector, a third distortion correcting vector, a fourth distortion correcting vector, a fifth distortion correcting vector, a six distortion correcting vector, the image processing device comprising:
  a processor; and
  a memory device storing instructions which when executed by the processor, cause the processor to:
    (a) for a first symmetrizing process and for a first arbitrary pan angle:
      (i) using the stored first distortion correcting vector, generate a first new distortion correcting vector; and
      (ii) using the stored second distortion correcting vector and the first new distortion correcting vector, correct the distortion of the original image;
    (b) for a second symmetrizing process and for a first arbitrary tilt angle:
      (i) using the stored third distortion correcting vector, generate a second new distortion correcting vector; and
      (ii) using the stored fourth distortion correcting vector and the second new distortion correcting vector, correct the distortion of the original image; and
    (c) for a third symmetrizing process and for a second arbitrary pan angle and a second arbitrary tilt angle:
      (i) using the stored fifth distortion correcting vector, generate a third new distortion correcting vector;
      (ii) using the stored sixth distortion correcting vector, generate a fourth new distortion correcting vector; and
      (ii) using the third new distortion correcting vector and the fourth new distortion correcting vector, correct the distortion of the original image,
  wherein the instructions, when executed by the processor, cause the processor to generate new distortion correcting vectors symmetrically with respect to an optical axis center line touching the central point of the optical axis by subjecting distortion correcting vectors to mirror image processing with the optical axis center line as an axis, and
  wherein the instructions, when executed by the processor, cause the processor to exclude an optical axis center region from objects for symmetrization.

2. The image processing device of claim 1, wherein the instructions, when executed by the processor, cause the processor to, for the first symmetrizing process and for the first arbitrary pan angle, generate a first new distortion correcting vector symmetrically with respect to an optical axis center line as a center in a pan direction touching the central point of the optical axis by subjecting a first distortion correcting vector to mirror image processing in the pan direction with the optical axis center line as an axis.

3. The image processing device of claim 1, wherein the instructions, when executed by the processor, cause the processor to, for the second symmetrizing process and for the first arbitrary tilt angle, generate a second new distortion correcting vector symmetrically with respect to an optical axis center line as a center in a tilt direction touching the central point of the optical axis by subjecting a second distortion correcting vector to mirror image processing in the tilt direction with the optical axis center line as an axis.

4. The image processing device of claim 1, wherein the instructions, when executed by the processor, cause the processor to, for the third symmetrizing process and for the second arbitrary pan angle and the second arbitrary tilt angle:
   (a) generate the third new distortion correcting vector symmetrically with respect to a first optical axis center line as a center in a pan direction touching the central point of the optical axis by subjecting the stored fifth distortion correcting vector to mirror image processing in the pan direction with the first optical axis center line as a first axis; and
   (b) generate the fourth new distortion correcting vector symmetrically with respect to a second optical axis center line as a center in a tilt direction touching the central point of the optical axis by subjecting the stored sixth distortion correcting vector to mirror image processing in the pan direction and the tilt direction with the second optical axis center line as a second axis.

5. The image processing device of claim 1, wherein the distortion correcting vectors include distortion correcting vectors prepared in advance for at least one of rotation, mirror image processing, and synthesis processing.

6. A camera device having an electronic pan and tilt function, the camera device comprising:
   an image pickup element;
   an optical system configured to form an image of a subject on the image pickup element, the optical system including a wide-angle lens having point-symmetric distortion with an optical axis as a center; and
   an image processing device configured to correct distortion of an original image picked up by the wide-angle lens and the image pickup element, the image processing device storing a first distortion correcting vector, a second distortion correcting vector, a third distortion correcting vector, a fourth distortion correcting vector, a fifth distortion correcting vector, and a sixth distortion correcting vector, the image processing device including:
   (a) a processor; and
   (b) a memory device storing instructions which when executed by the processor, cause the processor to:
      (i) for a first symmetrizing process and for a first arbitrary pan angle:
         (A) using the stored first distortion correcting vector, generate a first new distortion correcting vector; and
         (B) using the stored second distortion correcting vector and the first new distortion correcting vector, correct the distortion of the original image;
      (ii) for a second symmetrizing process and for a first arbitrary tilt angle:
         (A) using the stored third distortion correcting vector, generate a second new distortion correcting vector; and
         (B) using the stored fourth distortion correcting vector and the second new distortion correcting vector, correct the distortion of the original image; and
      (iii) for a third symmetrizing process and for a second arbitrary pan angle and a second arbitrary tilt angle:
         (A) using the stored fifth distortion correcting vector, generate a third new distortion correcting vector;
         (B) using the stored sixth distortion correcting vector, generate a fourth new distortion correcting vector; and
         (C) using the third new distortion correcting vector and the fourth new distortion correcting vector, correct the distortion of the original image,
   wherein the instructions, when executed by the processor, cause the processor to generate new distortion correcting vectors symmetrically with respect to an optical axis center line touching the central point of the optical axis by subjecting distortion correcting vectors to mirror image processing with the optical axis center line as an axis, and
   wherein the distortion correcting vectors parameters include distortion correcting vectors parameters prepared in advance for at least one of rotation, mirror image processing, and synthesis processing.

7. The camera device of claim 6, wherein the instructions, when executed by the processor, cause the processor to, for the first symmetrizing process and for the first arbitrary pan angle, generate a first new distortion correcting vector symmetrically with respect to an optical axis center line as a center in a pan direction touching the central point of the optical axis by subjecting a stored first distortion correcting vector to mirror image processing in the pan direction with the optical axis center line as an axis.

8. The camera device of claim 6, wherein the instructions, when executed by the processor, cause the processor to, for the second symmetrizing process and for the first arbitrary tilt angle, generate a second new distortion correcting vector symmetrically with respect to an optical axis center line as a center in a tilt direction touching the central point of the optical axis by subjecting a stored second distortion correcting vector to mirror image processing in the tilt direction with the optical axis center line as an axis.

9. The camera device of claim 6, wherein the instructions, when executed by the processor, cause the processor to, for the third symmetrizing process and for the second arbitrary pan angle and the second arbitrary tilt angle:
   (a) generate the third new distortion correcting vector symmetrically with respect to a first optical axis center line as a center in a pan direction touching the central point of the optical axis by subjecting the stored fifth distortion correcting vector to mirror image processing in the pan direction with the first optical axis center line as a first axis; and
   (b) generate the fourth new distortion correcting vector symmetrically with respect to a second optical axis center line as a center in a tilt direction touching the central point of the optical axis by subjecting the stored sixth distortion correcting vector to mirror image processing in the pan direction and the tilt direction with the second optical axis center line as a second axis.

10. The camera device of claim 6, wherein the distortion correcting vectors parameters include distortion correcting vectors prepared in advance for at least one of rotation, mirror image processing, and synthesis processing.

11. A method of operating an image processing device configured to correct distortion of an original image picked up by a wide-angle lens having a symmetrical distortion from a central point of an optical axis, the image processing device storing a first distortion correcting vector, a second distortion correcting vector, a third distortion correcting vector, and a fourth distortion correcting vector, a fifth distortion correcting vector, and a sixth distortion correcting vector, the method comprising:

(a) for a first symmetrizing process and for a first arbitrary pan angle:
  (i) causing a processor to execute instructions to, using the stored first distortion correcting vector, generate a first new distortion correcting vector; and
  (ii) using the stored second distortion correcting vector and the first new distortion correcting vector, causing the processor to execute the instructions to correct the distortion of the original image;

(b) for a second symmetrizing process and for a first arbitrary tilt angle:
  (i) causing the processor to execute the instructions to, using the stored third distortion correcting vector, generate a second new distortion correcting vector; and
  (ii) causing the processor to execute the instructions to, using the stored fourth distortion correcting vector and the second new distortion correcting vector, correct the distortion of the original image; and (c) for a third symmetrizing process and for a second arbitrary pan angle and a second arbitrary tilt angle:
  (i) causing the processor to execute the instructions to, using the stored fifth distortion correcting vector, generate a third new distortion correcting vector;
  (ii) causing the processor to execute the instructions to, using the stored sixth distortion correcting vector, generate a fourth new distortion correcting vector; and
  (ii) causing the processor to execute the instructions to, using the third new distortion correcting vector and the fourth new distortion correcting vector, correct the distortion of the original image, wherein the instructions, when executed by the processor, cause the processor to generate new distortion correcting vectors symmetrically with respect to an optical axis center line touching the central point of the optical axis by subjecting distortion correcting vectors to mirror image processing with the optical axis center line as an axis, and wherein the distortion correcting vectors parameters include distortion correcting vectors parameters prepared in advance for at least one of rotation, mirror image processing, and synthesis processing.

12. A non-transitory computer readable-medium storing instructions structured to cause an image processing device which is configured to correct distortion of an original image picked up by a wide-angle lens having a symmetrical distortion from a central point of an optical axis, the image processing device storing a first distortion correcting vector, a second distortion correcting vector, a third distortion correcting vector, a fourth distortion correcting vector, a fifth distortion correcting vector, and a sixth correcting vector, to:

(a) for a first symmetrizing process and for a first arbitrary pan angle:
  (i) using the stored first distortion correcting vector, generate a first new distortion correcting vector; and
  (ii) using the stored second distortion correcting vector and the first new distortion correcting vector, correct the distortion of the original image;

(b) for a second symmetrizing process and for a first arbitrary tilt angle:
  (i) using the stored third distortion correcting vector, generate a second new distortion correcting vector; and
  (ii) using the stored fourth distortion correcting vector and the second new distortion correcting vector, correct the distortion of the original image; and (c) for a third symmetrizing process and for a second arbitrary pan angle and a second arbitrary tilt angle:
  (i) using the stored fifth distortion correcting vector, generate a third new distortion correcting vector;
  (ii) using the stored sixth distortion correcting vector, generate a fourth new distortion correcting vector; and
  (ii) using the third new distortion correcting vector and the fourth new distortion correcting vector, correct the distortion of the original image, wherein the instructions, when executed by the processor, cause the processor to generate new distortion correcting vectors symmetrically with respect to an optical axis center line touching the central point of the optical axis by subjecting distortion correcting vectors to mirror image processing with the optical axis center line as an axis, and wherein the distortion correcting vectors parameters include distortion correcting vectors parameters prepared in advance for at least one of rotation, mirror image processing, and synthesis processing.

* * * * *